United States Patent
Liu et al.

(10) Patent No.: US 9,065,806 B2
(45) Date of Patent: Jun. 23, 2015

(54) INTERNET BASED SECURITY INFORMATION INTERACTION APPARATUS AND METHOD

(75) Inventors: Fengjun Liu, Shanghai (CN); Linrun Ding, Shanghai (CN); Jinyao Xu, Shanghai (CN); Chunhuan Li, Shanghai (CN); Tao Hai, Shanghai (CN); Chunye Hui, Shanghai (CN); Kun Jiang, Shanghai (CN); Tianshu Ma, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 8 days.

(21) Appl. No.: 14/006,294

(22) PCT Filed: Mar. 23, 2012

(86) PCT No.: PCT/CN2012/072922
§ 371 (c)(1),
(2), (4) Date: Dec. 2, 2013

(87) PCT Pub. No.: WO2012/126392
PCT Pub. Date: Sep. 27, 2012

(65) Prior Publication Data
US 2014/0095863 A1 Apr. 3, 2014

(30) Foreign Application Priority Data
Mar. 24, 2011 (CN) .......................... 2011 1 0073002

(51) Int. Cl.
*H04L 29/00* (2006.01)
*H04L 29/06* (2006.01)
(Continued)

(52) U.S. Cl.
CPC ........ *H04L 63/0428* (2013.01); *H04L 63/0823* (2013.01); *G06F 17/30861* (2013.01);
(Continued)

(58) Field of Classification Search
CPC ............ H04L 9/32; H04L 29/06; G06F 17/60

USPC ................................................... 713/153, 172
See application file for complete search history.

(56) References Cited

U.S. PATENT DOCUMENTS

| 7,523,489 B2 * | 4/2009 | Bossemeyer et al. ............. 726/9 |
| 2003/0097343 A1 * | 5/2003 | Pinizzotto ....................... 705/75 |

(Continued)

FOREIGN PATENT DOCUMENTS

| CN | 101694736 A | 4/2010 |
| CN | 201788511 U | 4/2011 |

(Continued)

*Primary Examiner* — Brandon Hoffman
*Assistant Examiner* — Michael D Anderson
(74) *Attorney, Agent, or Firm* — Blakely Sokoloff Taylor & Zafman

(57) ABSTRACT

The present invention discloses a device and method for security information interaction. The device for security information interaction includes: an interface circuit, configured to connect the device for security information interaction to an internet terminal; an information input unit, configured to allow user to input security information; a secure encryption/decryption unit, configured to store and process the security information; an information reader, configured to read information data from an external information carrier; wherein the secure encryption/decryption unit processes the security information in connection with the information data, and complete a business function on the secure channel through the interaction with the security information processing server. The device and method for security information interaction disclosed in the present invention improves the flexibility and efficiency of the information processing system, enhances the security of the information processing system, and extending new applications of an external information carrier in an open network environment.

24 Claims, 2 Drawing Sheets

(51) Int. Cl.
*G06F 21/34* (2013.01)
*G06F 21/72* (2013.01)
*G06F 21/83* (2013.01)
*G06F 21/84* (2013.01)
*G06F 21/85* (2013.01)
*G06F 17/30* (2006.01)

(52) U.S. Cl.
CPC .............. *H04L63/0853* (2013.01); *G06F 21/34* (2013.01); *G06F 21/72* (2013.01); *G06F 21/83* (2013.01); *G06F 21/84* (2013.01); *G06F 21/85* (2013.01); *G06F 2221/2107* (2013.01)

(56) References Cited

U.S. PATENT DOCUMENTS

2005/0144446 A1  6/2005  Kishimoto
2009/0199006 A1  8/2009  Stohn

FOREIGN PATENT DOCUMENTS

CN           202142067 U      2/2012
WO      WO 2005/106691 A1    11/2005

\* cited by examiner

INTERNET BASED SECURITY INFORMATION INTERACTION APPARATUS AND METHOD

TECHNICAL FIELD

The present invention relates to the device and method for information interaction, particularly, to the internet-based device and method for security information interaction.

BACKGROUND

At present, with the increasing popularity of the electronic computers and network communications and the increasing abundance of business applications, internet-based devices and methods for security information interaction are becoming more and more important. In the existing internet-based system for security information interaction (such as USB key), for different application, different information processing devices are used for information interaction. Therefore, when the same user needs to complete multiple operations about different applications, he/she will need to use different devices for information interaction, thereby the complexity of information processing is substantially increased and thus it will result in the lack of universality and simplicity. Moreover, in the existing internet-based system for security information interaction, the device for security information interaction typically receives the security information (e.g., the device startup PIN, the transaction password, etc.) entered by a user by means of an internet terminal (such as a PC, a portable computer, etc.). Therefore, there will be risks of information recording or hooking, and thus the security of the system may be lowered. Furthermore, in the existing internet-based system for security information interaction, the encryption and decryption of data are usually performed at the internet terminal, which are prone to be attacked and monitored and thus there exists greater potential security hazard.

Therefore, in order to accommodate increasing and varying application categories, there is a need for providing a device and system for security information interaction that can process the security information of a variety of applications with a high security level.

SUMMARY

In order to overcome the aforementioned deficiencies of the existing technical solutions, the present invention discloses a system and method for security information interaction.

The objects of the present invention are implemented by the following technical solutions:

A device for security information interaction, comprises:
an interface circuit, configured to connect the device for security information interaction to an internet terminal;
an information input unit, configured to allow user to input security information;
a secure encryption/decryption unit, configured to store and process the security information;
an information reader, configured to read information data from an external information carrier;
wherein the secure encryption/decryption unit process the security information in connection with the information data, and complete a business function on a secure channel through the interaction with the security information processing server.

In the solutions disclosed above, preferably, the secure encryption/decryption unit further comprises:

an initial register module, configured to complete the initial registration in connection with a digital certificate and the user's external information carrier when the device for security information interaction is first used;
a secure channel establishing module, configured to based on a handshake protocol, establish an secure channel on the internet between the device for security information interaction and the security information processing server;
a data encryption/decryption module, configured to complete the encryption/decryption transmission procedure of the application data based on a record layer protocol.

In the solutions disclosed above, preferably, the device for security information interaction further comprises a display unit configured to display information to the user of the device for security information interaction.

In the solutions disclosed above, preferably, the information reader is an IC card reader configured to read the information data in an IC card.

In the solutions disclosed above, preferably, the secure encryption/decryption unit employs hardware encryption mode.

In the solutions disclosed above, preferably, the user is required to input a device password when the device for security information interaction is used by the user.

In the solutions disclosed above, preferably, a registration procedure is performed when the device for security information interaction is initially used, and wherein the registration procedure includes associating the device for security information interaction with a particular external information carrier of the user.

In the solutions disclosed above, preferably, the external information carrier is an IC card.

In the solutions disclosed above, preferably, the certificate systems employed by the device for security information interaction comprises: a root certificate, a terminal root CA, a device certificate registration system, a device certificate, a security information processing server certificate, a service provider certificate and a device manufacturer certificate.

In the solutions disclosed above, preferably, the device for security information interaction employs an asymmetric key system.

In the solutions disclosed above, preferably, the device for security information interaction is capable of performing a query for particular data through the security information processing server.

In the solutions disclosed above, preferably, the device for security information interaction is capable of performing the transfer of the owned resources belonging to different parties through the security information processing server.

In the solutions disclosed above, preferably, the information input unit is a keyboard.

The objects of the present invention are also implemented by the following technical solutions:

A method for security information interaction comprises:
(A) when a security information interaction needs to be proceeded, establishing a secure channel on the internet between a device for security information interaction and a security information processing server;
(A2) reading, by an information reader of the device for security information interaction, information data from an external information carrier;
(A3) processing, by a secure encryption/decryption unit of the device for security information interaction, the security information based on the security information input by the user through the information input unit of the device for security information interaction and in connection with the information data, and completing a business function in the manner of encryption transmission based on the secure channel.

In the solutions disclosed above, preferably, the method for security information interaction further comprises an initial registration step in which the device for security information interaction is associated with at least one external information carrier.

In the solutions disclosed above, preferably, the initial registration step comprises:

(B1) connecting the device for security information interaction to an internet terminal, and connecting the external information carrier to the information reader;

(B2) logging on the specified register sever by the use of the terminal device certificate;

(B3) verifying the validity of the terminal device certificate, and if the verification succeeds, proceeding to step (B4), and if the verification fails, considering the registration as failed;

(B4) the register sever obtaining the information of the device for security information interaction, and verifying whether the device for security information interaction has been bound, and if the verification succeeds, the registration is completed successfully, and if the verification fails, proceeding to step (B5);

(B5) the user inputting and submitting the registration information;

(B6) the register sever extracting the information of the external information carrier via the device for security information interaction;

(B7) the register server verifying the validity of the external information carrier, and if the verification succeeds, proceeding to step (B8), and if the verification fails, considering the registration as failed;

(B8) the register server performing real-name verification of the registration information of the user, and if the verification succeeds, proceeding to step (B9), and if the verification fails, considering registration as failed;

(B9) the register server associating the user information with the device for security information interaction, and completing the registration.

In the solutions disclosed above, preferably, the method for security information interaction processes the security information by the use of hardware encryption mode.

In the solutions disclosed above, preferably, the step (A1) further comprises: based on a handshake protocol, establishing, by a secure channel establishing module in the device for security information interaction, an secure channel on the internet between the device for security information interaction and the security information processing server.

In the solutions disclosed above, preferably, the step (A3) further comprises: performing, by a data encryption/decryption module in the device for security information interaction, the encryption/decryption transmission of application data based on a record layer protocol.

In the solutions disclosed above, preferably, the user is required to input a device password when the device for security information interaction is used by the user.

In the solutions disclosed above, preferably, the information reader is an IC card reader configured to read the information data in an IC card.

In the solutions disclosed above, preferably, the step (A3) further comprises: displaying the result information related to the business function on a display unit of the device for security information interaction.

In the solutions disclosed above, preferably, the certificate systems employed by the method for security information interaction comprises: a root certificate, a terminal root CA, a device certificate registration system, a device certificate, a security information processing server certificate, a service provider certificate and a device manufacturer certificate.

In the solutions disclosed above, preferably, the method for security information interaction employs an asymmetric key system.

In the solutions disclosed above, preferably, the information input unit is a keyboard.

In the solutions disclosed above, preferably, the method for security information interaction is capable of performing query for particular data through the security information processing server.

In the solutions disclosed above, preferably, the method for security information interaction is capable of performing the transfer of the owned resources belonging to different parties through the security information processing server.

The device and method for security information interaction as disclosed herein have the following advantages:

Since the internet terminal can employ a variety of hardware implementations such as a computer or a mobile phone, the business interaction can be performed anywhere and anytime, thereby improving the flexibility of security information interaction. Meanwhile, the security and confidentiality of information interaction is enhanced. Moreover, the complexity of information processing is substantially reduced and the universality and simplicity are improved.

BRIEF DESCRIPTION OF THE DRAWINGS

The features and advantages will be better understood by one skilled in the art in connection with the drawings, in which.

DETAILED DESCRIPTION

Figure 1:
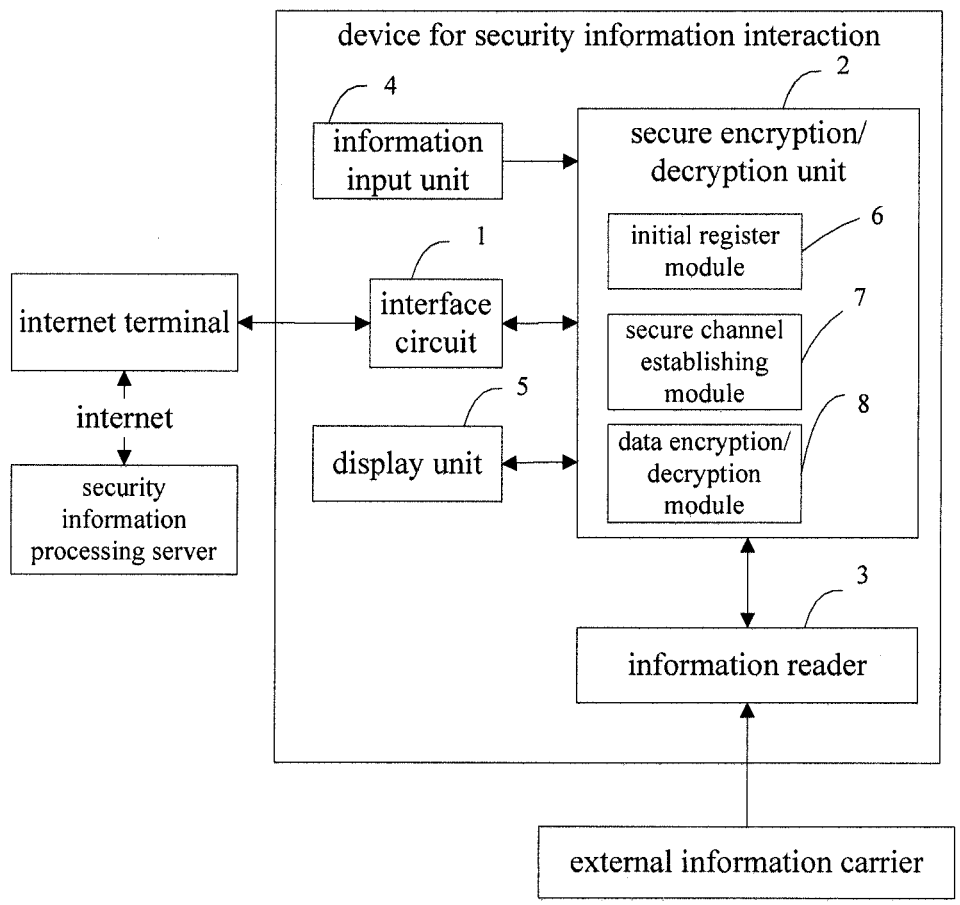
FIG. 1 is the structural view of the device for security information interaction according to the embodiment of the present invention.

FIG. 1 is the structural view of the device for security information interaction according to the embodiment of the present invention. As shown in FIG. 1, the device for security information interaction disclosed herein includes an interface circuit 1, a secure encryption/decryption unit 2, an information reader 3, and an information input unit 4. The interface circuit 1 is configured to connect the device for security information interaction to an internet terminal. The secure encryption/decryption unit 2 is configured to store and process the security information. The information reader 3 is configured to read information data (such as the ID number of an IC card) from an external information carrier (such as the IC card), such that the secure encryption/decryption unit 2 may process the security information in connection with the information data to complete business functions. The information input unit 4 is configured to allow user to input security information (such as the password).

As shown in FIG. 1, the interface circuit 1 may be any standard wired interface such as a USB interface, a serial interface, a parallel interface, an I2C interface, an IO interface or any standard wireless interface such as Bluetooth or WiFi, or any other customized interface. Moreover, the internet terminal includes drivers and applications executing thereon that are corresponding to the device for security information interaction. By way of example but without any limitation, the internet terminal may be a computer, a mobile phone, a PDA, or a netbook, etc.

As shown in FIG. 1, the secure encryption/decryption unit 2 is a secure carrier for storing and processing the security information, which employs hardware encryption mode. That is, the security information is stored in an encrypted chip, where the encrypted security information can only be decrypted by a particular system relevant to the business function.

As shown in FIG. 1, the secure encryption/decryption unit 2 further includes an initial register module 6, a secure channel establishing module 7 and a data encryption/decryption module 8. The initial register module 6 is configured to complete the initial registration in connection with digital certificates and the user's external information carrier (such as an IC card) when the device for security information interaction is first used. The secure channel establishing module 7 is configured to establish a secure channel on the internet between the device for secure information interaction and the security information processing server based on an handshake protocol. The data encryption/decryption module 8 is configured to complete the encryption transmission of application data based on the record layer protocol.

As shown in FIG. 1, the device for security information interaction disclosed herein has a doubling security information (such as the password) protection function. That is, when the device for security information interaction is used, the user is required to input a device password, and then when the business interaction is performed, the user is required to input an authentication password of the external information carrier. Therefore, the device for security information interaction disclosed herein improves the security and confidentiality of information interaction.

As shown in FIG. 1, the information reader 3 is an IC card reader. The IC card reader may be used to read the information data in the IC cards.

Optionally, the device for security information interaction further includes a display unit 5. The display unit 5 is configured to display information to the user of the device for security information interaction.

As shown in FIG. 1, the device for security information interaction disclosed herein is required to be initially registered when it is first used, and the basic registration procedure is as follows: a user connects the device for security information interaction to an internet terminal, and connects the external information carrier to the information reader 3 (for example, inserts the IC card); the user logs on the specified register sever by the use of the terminal device certificate; the validity of the terminal device certificate is verified, and if the verification succeeds, the procedure will proceed to the next step, and if the verification fails, the registration procedure will fail; the register server obtains the information of the device for security information interaction, and verifies whether the device for security information interaction has been bound (i.e., whether the device for security information interaction has been associated with a particular external information carrier (such as an IC card)), and if the verification succeeds, the registration is completed successfully, and if the verification fails, the registration procedure will proceed to the next step; the user inputs and submits the registration information; the register server extracts the information of the external information carrier via the device for security information interaction; the register server verifies the validity of the external information carrier, and if the verification succeeds, the registration procedure will proceed to the next step, and if the verification fails, the registration will fail; the register server performs real-name verification of the registration information of the user, and if the verification succeeds, the registration procedure will proceed to the next step, and if the verification fails, the registration will fail; the register server associates (i.e., binds) the user information with the device for security information interaction, and the registration is completed.

The following certificate system is utilized in the device for security information interaction disclosed herein: a root certificate, which is a signature certificate that is used by all the device for security information interaction CA systems to sign a certificate, wherein the private key is stored in the encrypted machine of the root CA center; a terminal root CA, which is used to sign security information processing server certificates (also referred to as "channel certificates"), service provider certificates (also referred to as "merchant certificates"), and device manufacturer certificates (also referred to as "terminal manufacturer certificates"); a device certificate register system (also referred to as "a terminal certificate register system"), which is located at the manufacturer of the device for security information interaction, and configured to apply for the required device certificate (also referred to as "terminal certificate") by the manufacturer from the root CA center; a device certificate, which is a digital certificate identifying the identity of the device for security information interaction, wherein each device for security information interaction will generate a unique device certificate when the device for security information interaction is pre-personalized, and the public and private keys of this device certificate is generated by the device for security information interaction itself, and the private key is stored in a sensitive area of the device for security information interaction and cannot be exported; a security information processing server certificate, which is a digital certificate that identifies the identity of the security information processing server (e.g., the e-bank system), wherein each security information processing server corresponds to a unique security information processing server certificate, which is used to verify the authentication of the security information processing server, and to prove the identity of the server when the server communicates with the devices for security information interaction; a service provider certificate, which is used to establish a secure data transmission channels between the service provider and the devices for security information interaction; a device manufacturer certificate, which is used to verify the valid identity of the device manufacturer and to verify the authentication of the application for data signatures.

As shown in FIG. 1, in the device for security information interaction disclosed herein, hardware encryption is used to ensure the safe input and encrypted processing of the security information (e.g., the personal identification number (PIN), the card number, the valid date, etc.), to perform the encryption and decryption processing and the verification of the validity and integrity for the data exchanged with the outside. Moreover, the device for security information interaction can safely store the keys and prohibit the direct access and output of the keys, thereby preventing the keys from being injected, replaced or used illegally by way of effective security mechanism.

A first exemplary operation procedure of the device for security information interaction disclosed herein is as follows: connecting a user's device for security information interaction with an internet terminal through the interface circuit 1; the secure channel establishing module 7 establishing a secure channel on the internet between the device for security information interaction and a security information processing server based on a handshake protocol, such that the mutual identification authentication and the exchange of the session keys are completed; the user causing at least one external information carrier to communicate with the information reader 3 (for example, by inserting an IC card) according to a prompt; the user inputting a startup PIN of the device 5 according to a prompt; prompting, by the device for security information interaction, the user to input the authentication password of the external information carrier according to the instructions of the security information processing server; completing the authentication procedure and a particular business function (such as an expense transaction) based on the secure channel, wherein the data encryption/decryption module 8 completes the encryption and decryption of the application data based on a record layer protocol.

A second exemplary operation procedure of the device for security information interaction disclosed herein is as follows: connecting the user's device for security information interaction with an internet terminal through the interface circuit 1; the secure channel establishing module 7 establishing a secure channel on the internet between the device for security information interaction and a security information processing server based on a handshake protocol, such that the mutual identification authentication and the exchange of the session keys are completed; the user causing at least one external information carrier to communicate with the information reader 3 (for example, by inserting an IC card) according to a prompt; the user inputting a startup PIN of the device according to a prompt; prompting, by the device for security information interaction, the user to input the authentication password of the external information carrier according to the instructions of the security information processing server; completing the authentication procedure and a query function for particular data (such as a query for the balance) based on the secure channel, wherein the data encryption/decryption module 8 completes the encryption and decryption of the application data based on a record layer protocol; displaying, by the device for secure information interaction, the result of the query on the display unit 5, or on a display of the internet terminal.

A third exemplary operation procedure of the device for security information interaction disclosed herein is as follows: connecting the user's device for security information interaction with an internet terminal through the interface circuit 1; establishing, by the secure channel establishing module 7, a secure channel on the internet between the device for security information interaction and a security information processing server based on a handshake protocol, such that the mutual identification authentication and the exchange of the session keys are completed; the user causing at least one external information carrier to communicate with the information reader 3 (for example, by inserting an IC card) according to a prompt; the user inputting a startup PIN of the device according to a prompt; prompting, by the device for security information interaction, the user to input the authentication password of the external information carrier according to the instructions of the security information processing server, and to input the information data of the transfer-out party's external information carrier (such as the ID number of an IC card) and an authentication code and to input the information data of the owned resource that is required to be transferred to a selected external information carrier (the owned resource belongs to the transfer-out party's external information carrier before the transfer, and includes, for example, data, information, and funds, etc.); completing the authentication procedure and the transferring-out of the owned source from the transfer-out party's external information carrier based on the secure channel, wherein the data encryption/decryption module 8 completes the encryption and decryption of the application data based on a record layer protocol.

Preferably, the device for security information interaction disclosed herein employs an asymmetric key system.

Preferably, the information input unit of the device for security information interaction disclosed herein is a keyboard.

Figure 2:
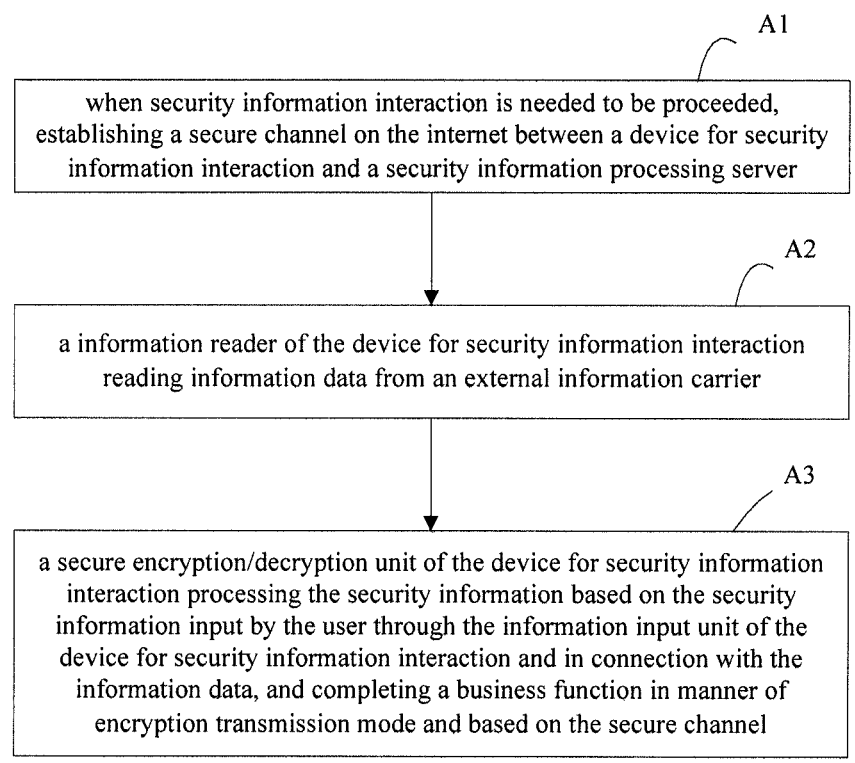
FIG. 2 is the flowchart of the method for security information interaction according to the embodiment of the present invention.

FIG. 2 is the flowchart of the method for security information interaction according to the embodiment of the present invention. As shown in FIG. 2, the method for security information interaction disclosed herein includes the following steps:

(A1) when security information interaction is needed to be proceeded, the device for security information interaction establishing a secure channel on the internet between it and the security information processing server;

(A2) the reader of the device for security information interaction reading information data from an external information carrier (such as an IC card);

(A3) the secure encryption/decryption unit of the device for security information interaction processing the security information based on the security information input by the user through the information input unit of the device for security information interaction and in connection with the information data, and completing a business function (for example, an expense transaction) by the use of encryption transmission mode and based on the secure channel.

As shown in FIG. 2, the method for security information interaction also includes an initial registration step of associating (i.e., binding) the device for security information interaction with at least one external information carrier (such as an IC card), and the step includes:

(B1) the user connecting the device for security information interaction to an internet terminal, and connecting the external information carrier with the information reader 3 (for example, by inserting the IC card);

(B2) logging on the specified register sever by the use of a terminal device certificate;

(B3) verifying the validity of the terminal device certificate, and if the verification succeeds, proceeding to the next step, and if the verification fails, considering the registration as failed;

(B4) the register sever obtaining the information of the device for security information interaction, and verifying whether the device for security information interaction has been bound (i.e., whether the device for security information interaction has been associated with a particular external information carrier (such as an IC card)), and if the verification succeeds, the registration is completed successfully, and if the verification fails, proceeding to the next step;

(B5) the user inputting and submitting the registration information;

(B6) the register sever extracting the information of the external information carrier via the device for security information interaction;

(B7) the register server verifying the validity of the external information carrier, and if the verification succeeds, proceeding to the next step, and if the verification fails, the registration procedure is failed;

(B8) the register server performing real-name verification of the registration information of the user, and if the verification succeeds, proceeding to the next step, and if the verification fails, the registration procedure is failed;

(B9) the register server associating (i.e., binding) the user information with the device for security information interaction, and the registration procedure is completed.

Preferably, in the method for security information interaction disclosed herein, the device for security information interaction includes an interface circuit 1 connected with an internet terminal. The interface circuit 1 may be any standard wired interface such as a USB interface, a serial interface, a parallel interface, an I2C interface, an IO interface or any standard wireless interface such as Bluetooth or WiFi, or any other customized interface. Moreover, the internet terminal includes drivers and applications executing thereon that are corresponding to the device for security information interaction. By way of example but without any limitation, the internet terminal may be a computer, a mobile phone, a PDA, or a netbook, etc.

Preferably, in the method for security information interaction disclosed herein, hardware encryption mode is employed. That is, the security information is stored in an encrypted chip, where the encrypted security information can only be decrypted by a particular system relevant to the business function.

Preferably, in the method for security information interaction disclosed herein, the step (A1) further includes: establishing, by the secure channel establishing module in the device for security information interaction, a secure channel on the internet between the device for security information interaction and the security information processing server based on a handshake protocol.

Preferably, in the method for security information interaction disclosed herein, the step (A3) further includes: the data encryption/decryption module in the device for security information interaction performing the encryption transmission of application data based on a record layer protocol.

Advantageously, the method for security information interaction disclosed herein employs a doubling security information (such as the passwords) protection mechanism. That is, when the device for security information interaction is used, the user is required to input a device password, and then when the business interaction is performed, the user is required to input an authentication password of the external information carrier. Therefore, the method for security information interaction disclosed herein improves the security and confidentiality of information interaction.

Preferably, the information reader is a IC card reader. The IC card reader can be used to read the information data in the IC cards.

Optionally, the step (A3) further includes: displaying the result information related to the business function on a display unit of the device for security information interaction.

Preferably, the following certificate system is utilized in the method for security information interaction disclosed herein: a root certificate, which is a signature certificate that is used by all the device for security information interaction CA systems to sign a certificate, wherein the private key is stored in the encrypted machine of the root CA center; a terminal root CA, which is used to sign security information processing server certificates (also referred to as "channel certificates"), service provider certificates (also referred to as "merchant certificates"), and device manufacturer certificates (also referred to as "terminal manufacturer certificates"); a device certificate register system (also referred to as "a terminal certificate register system"), which is located at the manufacturer of the device for security information interaction, and is used to apply for the required device certificate (also referred to as "terminal certificate") by the manufacturer from the root CA center; a device certificate, which is a digital certificate identifying the identity of the device for security information interaction, wherein each device for security information interaction will generate a unique device certificate when the device for security information interaction is pre-personalized, and the public and private keys of this device certificate is generated by the device for security information interaction itself, and the private key is stored in a sensitive area of the device for security information interaction and cannot be exported; a security information processing server certificate, which is a digital certificate that identifies the identity of the security information processing server (e.g., the e-bank system), wherein each security information processing server corresponds to a unique security information processing server certificate, which is used to verify the authentication of the security information processing server, and to prove the identity of the server when the server communicates with the device for security information interaction; a service provider certificate, which is used to establish secure data transmission channels between the service provider and the device for security information interaction; a device manufacturer certificate, which is used to verify the valid of the identity of the device manufacturer and to verify the authentication of the application for data signatures.

Preferably, in the method for security information interaction disclosed herein, hardware encryption is used to ensure the safe input and encryption processing of the security information (e.g., the personal identification number (PIN), the card number, the valid date, etc.), to perform the encryption and decryption processing of the data exchanged with the outside and the verification of the validity and integrity of the data exchanged with the outside. Moreover, the device for security information interaction can safely store the keys and prohibit the direct access and output of the keys, thereby preventing the keys from being injected, replaced or used illegally by the use of effective security mechanism.

Preferably, the method for security information interaction disclosed herein employs an asymmetric key system.

Preferably, in the method for security information interaction disclosed herein, the information input unit is a keyboard.

Preferably, the method for security information interaction disclosed herein can perform a query for particular data (such as a query for the balance) through the security information process server.

Preferably, the method for security information interaction can perform the transferring operation (such as transaction of credit for load) of the owned resources (for example, including data, information, and funds, etc.) belonging to different parties.

Although the present invention has been described with the above preferred embodiments, the implementation of the invention is not limited to these embodiments. It should be appreciated that a variety of changes and modifications may be made to the present invention by one skilled in the art without departing from the spirit and scope of the present invention.

What is claimed is:

1. A device for security information interaction, comprising:
    an interface circuit, configured to connect the device for security information interaction to an Internet terminal;
    an information input unit, configured to allow user to input security information;
    a secure encryption/decryption unit, configured to store and process the security information;
    an information reader, configured to read information data from an external information carrier;

wherein the secure encryption/decryption unit processes the security information in connection with the information data, and completes a business function on the secure channel through the interaction with a security information processing server coupled to said device for security information interaction via the Internet, and wherein the secure encryption/decryption unit further comprises:

an initial register module, configured to complete the initial registration in connection with a user's personal information a digital certificate and the external information carrier when the device for security information interaction is first used;

a secure channel establishing module, configured to establish an end-to-end secure channel on the Internet between the device for security information interaction and the security information processing server based on a handshake protocol;

a data encryption/decryption module, configured to complete an encryption/decryption transmission of the application data based on a record layer protocol.

2. The device for security information interaction according to claim 1, further comprising a display unit configured to display information to the user of the device for security information interaction.

3. The device for security information interaction according to claim 2, wherein the information reader is an IC card reader configured to read the information data in an IC card.

4. The device for security information interaction according to claim 3, wherein the secure encryption/decryption unit employs hardware encryption mode.

5. The device for security information interaction according to claim 4, wherein the user is required to input a device password when the device for security information interaction is used.

6. The device for security information interaction according to claim 5, wherein a registration procedure is performed when the device for security information interaction is initially used, and wherein the registration procedure includes associating the device for security information interaction with the digital certificate and a particular external information carrier of the user.

7. The device for security information interaction according to claim 6, wherein the external information carrier is an IC card.

8. The device for security information interaction according to claim 7, wherein the certificate systems employed by the device for security information interaction comprises:
a root certificate;
a terminal root CA;
a device certificate registration system,
a device certificate;
a security information processing server certificate;
a service provider certificate; and
a device manufacturer certificate.

9. The device for security information interaction according to claim 8, wherein the device for security information interaction employs an asymmetric key system.

10. The device for security information interaction according to claim 9, wherein the device for security information interaction is capable of performing a query for particular data through the security information processing server.

11. The device for security information interaction according to claim 10, wherein the device for security information interaction is capable of performing transferring operation of the owned resources belonging to different parties through the security information processing server.

12. The device for security information interaction according to claim 11, wherein the information input unit is a keyboard.

13. A method for security information interaction, comprising:

(A1) when security information interaction is needed to be proceeded, establishing a secure channel between a device for security information interaction and a security information processing server coupled to said device for security information interaction via the Internet;

(A2) an information reader of the device for security information interaction reading information data from an external information carrier;

(A3) a secure encryption/decryption unit of the device for security information interaction processing the security information based on the security information input by a user through an information input unit of the device for security information interaction and in connection with the information data, and completing a business function on the secure channel through the interaction with the security information processing server, wherein the step (A1) includes a secure channel establishing module in the device for security information interaction establishing an end-to-end secure channel on the Internet between the device for security information interaction and the security information processing server based on a handshake protocol, and wherein the step (A3) includes a data encryption/decryption module in the device for security information interaction performing the encryption/decryption transmission of application data based on a record layer protocol.

14. The method for security information interaction according to claim 13, further comprising an initial registration step of associating the device for security information interaction with at least one external information carrier.

15. The method for security information interaction according to claim 14, wherein the initial registration step comprises:

(B1) connecting the device for security information interaction to an Internet terminal, and connecting the external information carrier with the information reader;

(B2) logging on the specified register server by the use of the terminal device certificate;

(B3) verifying the validity of the terminal device certificate, and if the verification succeeds, proceeding to step (B4), and if the verification fails, the registration procedure is failed;

(B4) the register server obtaining the information of the device for security information interaction, and verifying whether the device for security information interaction has been bound, and if the verification succeeds, the registration procedure is completed successfully, and if the verification fails, proceeding to step (B5);

(B5) the user inputting and submitting the registration information;

(B6) the register server extracting the information of the external information carrier via the device for security information interaction;

(B7) the register server verifying the validity of the external information carrier, and if the verification succeeds, proceeding to step (B8), and if the verification fails, the registration procedure is failed;

(B8) the register server performing real-name verification of the registration information of the user, and if the verification succeeds, proceeding to step (B9), and if the verification fails, the registration procedure is failed;

(B9) the register server associating the user information with the device for security information interaction, and the registration procedure is completed.

16. The method for security information interaction according to claim 15, wherein the method for security information interaction processes the security information in hardware encryption mode.

17. The method for security information interaction according to claim 13, wherein the user is required to input a device password when the device for security information interaction is used.

18. The method for security information interaction according to claim 17, wherein the information reader is an IC card reader configured to read the information data in an IC card.

19. The method for security information interaction according to claim 18, wherein the step (A3) further comprises:
   displaying the result information related to the business function on a display unit of the device for security information interaction.

20. The method for security information interaction according to claim 19, wherein the certificate systems employed by the method for security information interaction comprises:
   a root certificate;
   a terminal root CA;
   a device certificate registration system;
   a device certificate;
   a security information processing server certificate;
   a service provider certificate; and
   a device manufacturer certificate.

21. The method for security information interaction according to claim 20, wherein the method for security information interaction employs an asymmetric key system.

22. The method for security information interaction according to claim 21, wherein the information input unit is a keyboard.

23. The method for security information interaction according to claim 22, wherein the method for security information interaction is capable of performing a query for particular data through the security information processing server.

24. The method for security information interaction according to claim 23, wherein the method for security information interaction is capable of performing transferring operation of the owned resources belonging to different parties through the security information processing server.

* * * * *

UNITED STATES PATENT AND TRADEMARK OFFICE
CERTIFICATE OF CORRECTION

PATENT NO. : 9,065,806 B2  
APPLICATION NO. : 14/006294  
DATED : June 23, 2015  
INVENTOR(S) : Fengjun Liu et al.

Page 1 of 1

It is certified that error appears in the above-identified patent and that said Letters Patent is hereby corrected as shown below:

In the claims

Column 11, Claim 1, lines 10-11, delete "personal information a digital certificate" and insert -- personal information, a digital certificate --

Column 11, Claim 8, line 51, delete "a device certificate registration system," and insert -- a device certificate registration system; --

Signed and Sealed this  
Twenty-second Day of March, 2016

Michelle K. Lee  
*Director of the United States Patent and Trademark Office*